(12) United States Patent
Yamamoto et al.

(10) Patent No.: US 8,260,712 B2
(45) Date of Patent: Sep. 4, 2012

(54) MULTIMEDIA-TYPE CONTENTS REPRODUCTION DEVICE AND REPRODUCTION METHOD, AND RECORDING MEDIUM HAVING STORED THEREON DATA USED FOR THE SAME

(75) Inventors: Masaya Yamamoto, Hirakata (JP); Kouji Miura, Matsubara (JP); Katsumi Tokuda, Ikeda (JP); Masami Yamashita, Shinagawa-ku (JP); Yasuaki Yamagishi, Shinagawa-ku (JP); Naohisa Kitazato, Shinagawa-ku (JP)

(73) Assignee: Panasonic Corporation, Osaka (JP)

( * ) Notice: Subject to any disclaimer, the term of this patent is extended or adjusted under 35 U.S.C. 154(b) by 1091 days.

(21) Appl. No.: 10/560,855

(22) PCT Filed: Nov. 17, 2004

(86) PCT No.: PCT/JP2004/017071
§ 371 (c)(1),
(2), (4) Date: Dec. 15, 2005

(87) PCT Pub. No.: WO2005/050459
PCT Pub. Date: Jun. 2, 2005

(65) Prior Publication Data
US 2007/0094143 A1    Apr. 26, 2007

(30) Foreign Application Priority Data
Nov. 19, 2003  (JP) .................... 2003-389563

(51) Int. Cl.
*G06Q 99/00* (2006.01)
(52) U.S. Cl. ............................. 705/59; 726/26

(58) Field of Classification Search ........... 705/50–79
See application file for complete search history.

(56) References Cited

U.S. PATENT DOCUMENTS

| | | | | |
|---|---|---|---|---|
| 5,579,222 A * | 11/1996 | Bains et al. | ............... | 717/167 |
| 5,671,412 A * | 9/1997 | Christiano | ............... | 1/1 |
| 5,742,757 A * | 4/1998 | Hamadani et al. | ............... | 726/32 |
| 5,754,763 A * | 5/1998 | Bereiter | ............... | 726/28 |
| 6,226,618 B1 * | 5/2001 | Downs et al. | ............... | 705/1 |
| 6,289,165 B1 * | 9/2001 | Abecassis | ............... | 386/46 |
| 6,393,158 B1 * | 5/2002 | Gould et al. | ............... | 382/254 |

(Continued)

FOREIGN PATENT DOCUMENTS
EP    0 798 892    10/1997
(Continued)

OTHER PUBLICATIONS

Muller, "Desktop Encyclopedia of the Internet", 1999, Artech House Inc., Norwood, MA, all pages.*

(Continued)

*Primary Examiner* — Jacob C. Coppola
(74) *Attorney, Agent, or Firm* — Wenderoth, Lind & Ponack, L.L.P.

(57) ABSTRACT

Providing a data structure appropriate for performing rights management for multimedia-type contents, and further providing a recording medium containing data with the data structure, and a reproduction device and a reproduction method for reproducing the data. The present invention is a computer-readable recording medium having recorded thereon license data for permitting a computer to use contents data comprising a plurality of resources, the license data including a resource-based use condition configuration structure, in which a use condition is set for the computer with respect to each of resources.

9 Claims, 11 Drawing Sheets

U.S. PATENT DOCUMENTS

| | | | |
|---|---|---|---|
| 6,920,567 B1* | 7/2005 | Doherty et al. | 726/22 |
| 2002/0002466 A1* | 1/2002 | Kambayashi et al. | 705/1 |
| 2002/0152874 A1* | 10/2002 | Vilcauskas et al. | 84/600 |
| 2003/0028490 A1* | 2/2003 | Miura et al. | 705/59 |
| 2003/0028622 A1* | 2/2003 | Inoue et al. | 709/219 |
| 2003/0174837 A1* | 9/2003 | Candelore et al. | 380/210 |
| 2003/0215217 A1 | 11/2003 | Horii et al. | |
| 2004/0168052 A1* | 8/2004 | Clisham et al. | 713/153 |
| 2004/0186853 A1* | 9/2004 | Yamamoto et al. | 707/104.1 |
| 2006/0012683 A9* | 1/2006 | Lao et al. | 348/207.99 |
| 2007/0094143 A1* | 4/2007 | Yamamoto et al. | 705/59 |

FOREIGN PATENT DOCUMENTS

| | | |
|---|---|---|
| EP | 1 081 616 | 3/2001 |
| JP | 60-77218 | 5/1985 |
| JP | 7302244 | 11/1995 |
| JP | 2002/288376 | 10/2002 |
| JP | 2004-5939 | 1/2004 |
| JP | 2004-326757 | 11/2004 |
| WO | 98/42098 | 9/1998 |
| WO | 99/38095 | 7/1999 |
| WO | 2004-092933 | 10/2004 |

OTHER PUBLICATIONS

Gralla, "How the Internet Works", Millennium Edition, 1999, Que Corporation, Indianapolis, IN, all pages.*

White, "How Computers Work", Millennium Edition, 1999, Que Corporation, Indianapolis, IN, all pages.*

Derfler, "How Networks Work", Bestseller Edition, 1996, Ziff-Davis Press, Emeryville, CA, all pages.*

Koichiro Akiyama et al., "'A Secure and Reliable Software Rental System': Computer Security Symposium 2000—Theses Collection", Transactions of Information Processing Society of Japan Symposium Series vol. 2000, No. 12 (Oct. 26, 2000), pp. 19-24 (with English translation).

Minoru Shibamiya et al., "'Security Kanri No Gijutsu': Jissenteki Software Kaihatsu Kogaku Series 6, $1^{st}$ ed.", (Jul. 30, 1993), pp. 20-25 (with English translation).

Kei Ogino, "'IE&OL no Joshiki Part, 5': Pcfan.", Nov. 1, 2002, vol. 9, No. 30, pp. 140 and 141 (with English translation).

Supplementary European Search Report mailed Mar. 16, 2012 in corresponding European Application No. EP 04 81 8920.

Eskicioglu et al., "An Overview of Multimedia Content Protection in Consumer Electronics Devices", *Signal Processing: Image Communication* 16, Apr. 2001, p. 681-699.

Ripley et al., "Content Protection in the Digital Home", *Intel Technology Journal*, vol. 6, No. 4, Nov. 15, 2002, p. 49-56.

* cited by examiner

FIG. 12

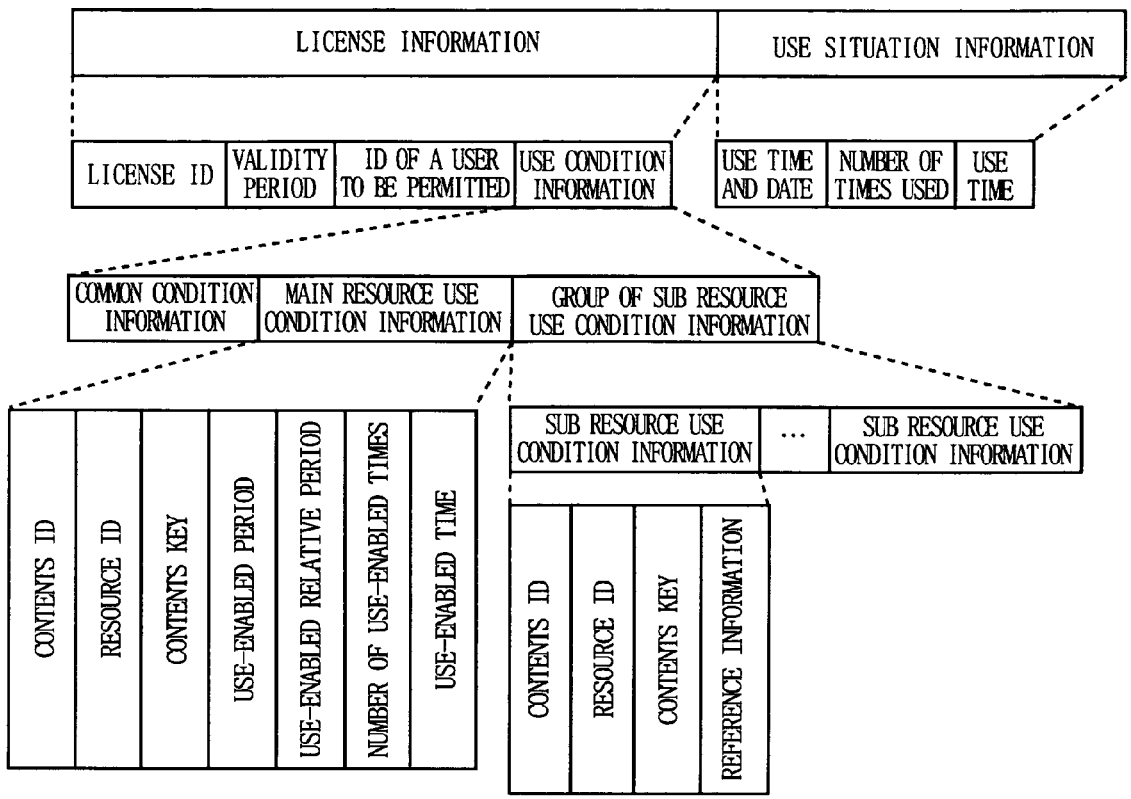

FIG. 13

| CLIENT REPRODUCTION RESPONSE MESSAGE | | |
|---|---|---|
| RESOURCE CLASSIFICATION | CONTENTS KEY | RENDERER USE CONDITION INFORMATION |

FIG. 14

| RENDERER USE CONDITION INFORMATION |
|---|
| TIME UP TO AN END OF VALIDITY PERIOD |
| WHETHER OR NOT QUALITY CONVERSION DURING REPRODUCTION IS PERMITTED |
| LIMITATION ON AN ANALOGUE OUTPUT |
| TOTAL AMOUNT OF TIME IN WHICH CONTENTS ARE USED |
| WHETHER OR NOT THERE IS A LIMITATION GIVEN TO A NUMBER OF TIMES USED |

MULTIMEDIA-TYPE CONTENTS REPRODUCTION DEVICE AND REPRODUCTION METHOD, AND RECORDING MEDIUM HAVING STORED THEREON DATA USED FOR THE SAME

BACKGROUND OF THE INVENTION

1. Field of Invention

The present invention relates to a reproduction device and a reproduction method for contents protected by copyright, and a recording medium having recorded thereon data used for the same. More particularly, the present invention relates to a reproduction device and a reproduction method for multimedia-type contents protected by the copyright, and a recording medium having recorded thereon data for the same.

2. Description of Related Art

In a conventional contents distribution system using Digital Rights Management (DRM) system, streaming-type contents such as music or a movie are primary objects for the distribution. For the streaming-type contents, a model (hereinafter referred to as a rights management model) to manage the copyright is already being established. Hereinafter, a reproduction procedure of the contents according to the conventional rights management model will be described.

Initially, a procedure at a start of reproduction will be explained. First, a contents reproduction device determines whether or not a use of contents is possible by referring to a license associated with the contents. Here, a license is information required for a contents use, and information indicating a use condition for the contents. If it is determined that a use is possible, the reproduction device locks the license. Then, the reproduction device extracts a decryption key, of the contents, which is contained in the license. Next, the reproduction device uses the extracted decryption key to decrypt the contents, and reproduces the contents.

Next, a procedure performed when terminating a reproduction will be described. First, the reproduction device updates content of the license in accordance with a use situation at an end of the reproduction. For example, the reproduction device reduces a remaining use time, or the like, thereby updating the contents of the license. Then, the reproduction device releases the license lock.

As described above, the conventional reproduction device locks a license at a beginning of a reproduction, updates the license in accordance with a use situation and releases the lock at an end of the reproduction. Therefore, the license is updated each time contents are used to prevent illegal use of the contents.

[Patent Document 1] Japanese Laid-Open Patent Publication No.

BRIEF DISCLOSURE OF THE INVENTION

In recent years, multimedia-type contents adopted for a DVD, besides streaming-type contents, are becoming an object for distribution through a network. If the conventional rights management model, as it is, is applied to deal with the multimedia-type contents, various problems may occur.

Here, multimedia-type contents mean an integration of the conventional streaming-type contents such as a motion picture, and menu-type contents including a structured text or a still picture. With the multimedia-type contents, a transition from a menu screen to a main motion picture, or a simultaneous display on a screen of a main motion picture and related information can be achieved.

For the multimedia-type contents, the menu-type contents such as a menu screen is realized by a structured text such as HTML (Hyper Text Markup Language). For the menu-type contents realized by the structured text, a link between the menu screen and a plurality of still pictures is defined. Therefore, related information such as a plurality of still pictures are simultaneously displayed on the menu screen.

If the conventional rights management model is applied to such multimedia-type contents, the licenses for a starting a reproduction, for a main motion picture, for a menu screen and a plurality of still pictures are all locked. This, therefore, causes a problem where a simultaneous display of a main picture and a related information screen is not realized, or pictures behind a first still picture cannot be displayed on the menu screen.

Also, at an end of a reproduction, since all the licenses for a main motion picture, a menu screen and a plurality of still pictures are updated, a use condition is updated even for information not requiring the rights management, which, as a consequence, gives restriction on a use.

This results from a data structure of rights management used for streaming-type contents being inadequate for the multimedia-type contents.

Therefore, an object of the present invention is to provide an appropriate data structure for performing the rights management for the multimedia-type contents, and to further provide a recording medium having recorded thereon the data with the data structure, a reproduction device and a reproduction method for the data reproduction.

To solve above-mentioned problem, the present invention has the following features. The present invention is a computer-readable recording medium having recorded thereon license data for permitting a computer to use contents data comprising a plurality of resources. The recording medium has also recorded thereon a license data including a resource-based use condition configuration structure, in which a use condition is set for the computer with respect to each of resources.

Preferably, the recording medium has recorded thereon license data for permitting the computer to use, in accordance with the use condition, one of the resources, which corresponds to the use condition.

Preferably, the recording medium has further recorded thereon license data containing an updateable use situation configuration structure for allowing the computer to register a use situation of at least one of the resources.

Preferably, the plurality of resources each include at least one main resource whose use situation needs to be managed by the computer, and a plurality of sub resources whose use situations do not need to be managed by the computer. The use situation configuration structure is a data structure for causing the computer to set a use situation of the main resource.

Preferably, the plurality of resources each include at least one main resource whose license needs to be locked when a use of the resource by the computer starts, and a plurality of sub resources whose license do not need to be locked. The resource-based use condition configuration structure has registered therein classification information indicating a use condition regarding the main resource or a use condition regarding a sub resource. The classification information is used for causing the computer to determine whether or not a license needs to be locked.

Note that the present invention is a contents reproduction method for reproducing contents data containing a plurality of resources each using license data corresponding to the contents data. The plurality of resources each comprise at least one main resource including a main part of contents, a plurality of sub resources including related information associated with the main part of the contents, and have a feature to cause a license management device for managing license data to lock the license data corresponding to contents data to be reproduced only when a computer starts a reproduction of the main resource.

Preferably, only when the computer terminates a reproduction of the main resource, the license management device is caused to release a lock of license data corresponding to the contents data to be reproduced, and to update use situation information within license data.

Also, the present invention is a contents reproduction device for reproducing contents data containing a plurality of resources each using the license data corresponding to the contents data. The plurality of resources each include: at least one main resource of a main part of the contents; a plurality of sub resources containing related information associated with the main part of the contents; a license management means for managing license data; a license lock means for causing the license management means to lock the license data corresponding to contents data to be reproduced, only when a computer starts to reproduce the main resource.

Preferably, only when a computer terminates a reproduction of the main resource, the reproduction device further comprises a license lock releasing means to provide the license management means a report that the reproduction of the main resource is completed, and to cause the license management means to release a lock of the license data corresponding to the contents data to be reproduced, and to update use condition information within the license data.

Further, the reproduction device comprises a plurality of resource reproduction sections for reproducing each resource.

Preferably, the plurality of sub resources are encrypted. The plurality of resource reproduction sections each include a main resource reproduction section for reproducing a main source, and a sub resource reproduction section for reproducing the sub resource. The sub resource reproduction section may include a decryption section for decrypting a plurality of sub resources collectively, a cache section for temporarily storing the decrypted sub resources, and a decoding section for reproducing the sub resources by utilizing the decrypted sub resources stored in the cache section.

Preferably, at least the decryption section may be tamper resistant.

Preferably, the plurality of sub resources are further compressed collectively. The decryption section may decrypt the plurality of sub resources, extract the compressed sub resources and temporarily store the sub resources in the cache section after the extraction and the decryption are completed.

According to the present invention, since a use condition is set on a resource-base, it becomes possible for multimedia-type contents comprising a plurality of resources to set a use condition per each resource. As a result, the present invention is able to, and does, provide a recording medium having recorded thereon data with the data structure appropriate for the rights management of the multimedia-type contents, a reproduction device and a reproduction method for reproducing the data.

Also, according to the present invention, since use situation for only a part of resources is registered rather than use situation for all the resources is registered, for the resources not requiring rights management, use situation does not need to be managed. Especially, only for a main resource including a main part of contents, a use condition is registered and its rights management is performed.

Also, according to the present invention, a license is locked only when a main resource is reproduced, which enables a simultaneous reproduction of the main resource and a sub resource.

Further, according to the present invention, a license lock is released only when a reproduction of the main resource is terminated, which enables only the reproduction outcome of the main resource to be reflected on an update of license data.

Additionally, according to the present invention, since a plurality of sub resources are decrypted, cached and reproduced using the cached sub resources, the process involved in contents reproduction is lightened.

Furthermore, by making the decryption section tamper resistant, leakage of a contents key can be prevented.

BRIEF DESCRIPTION OF THE DRAWINGS

FIG. 12 is a diagram showing a data structure of a license.

FIG. 13 is a diagram showing a data configuration of a client reproduction response message.

FIG. 14 is a diagram showing a data configuration of renderer use condition information.

DETAILED DESCRIPTION OF THE INVENTION

Figure 1:
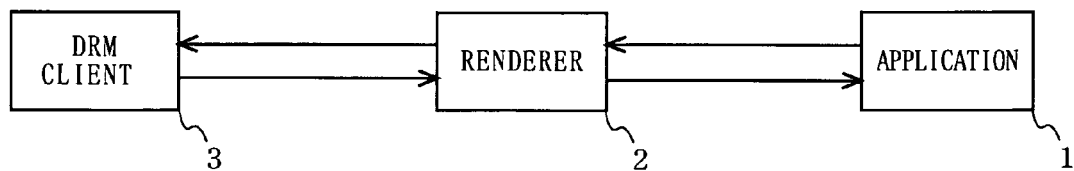
FIG. 1 is a diagram showing an entire configuration of a rights management system according to a first embodiment of the present invention.

FIG. 1 is a diagram showing an entire configuration of a rights management system according to a first embodiment of the present invention. According to FIG. 1, the rights management system comprises an application 1, a renderer 2 and a DRM client 3. The rights management system shown in FIG. 1 may be realized by a single computer device or by a plurality of computer devices.

According to the present embodiment, contents are encrypted. To reproduce the encrypted contents, a license is required. The license contains a contents key to decrypt the encrypted contents, and a condition upon which a contents use is permitted. A contents reproduction is achieved by decrypting the contents by using the contents key contained in the license.

Multimedia-type contents used in the present embodiment include at least one main resource and a plurality of sub resources. The main resource is, for example, streaming-type contents containing motion picture of a main part, or the like. A sub resource is contents such as a menu screen defined by a structured text such as HTML, a plurality of still pictures linked to the menu screen, a plurality of still pictures or a text used as related information, and motion picture image. That is, a sub resource includes related information associated with to the main part. According to the present embodiment, for a easier understanding, the main resource is described as main part images, and the sub resource is described as related information associated with the main part, but the present embodiment is not restricted thereto if multimedia-type contents are divided into a main resource and a sub resource.

In the following descriptions, a simple reference to "contents" inclusively means a main resource contents and sub resource contents. The contents are stored in a recording device (not shown) such as a hard disk, or the like. Hereinafter, a section in which the contents are stored is referred to as a contents storing section. An illustration of the contents storing section is omitted. The contents storing section exists inside a computer system, which realizes the application 1, the renderer 2 and the DRM client 3. In a case where a main resource and a sub resource are multiplexed into contents to be transmitted by the Carousel method, the contents need not be stored in the contents storing section.

The application 1 causes the renderer 2 to reproduce the contents stored in the contents storing section, thereby executing a required process. The application 1 is realized by a computer device executing a program, or the like, to realize the required process.

When the application 1 is required to reproduce the contents stored in the contents storing section, the application 1 transmits to the renderer 2 a message (hereinafter referred to as an application reproduction request message: see FIG. 3 below) requesting the contents reproduction to start. Also, when the application 1 is required to control the contents reproduction such as pausing, fast-forwarding and rewinding, the application 1 transmits to the renderer 2 a message (hereinafter referred to as a reproduction control message) requesting the contents reproduction to be controlled. Furthermore, when the application 1 is required to terminate the contents reproduction, the application 1 transmits to the renderer 2 a message (hereinafter referred to as an application termination request message: see FIG. 4 below) requesting the contents reproduction to be terminated.

The renderer 2 is a device for contents reproduction, which responds to a request from the application 1. The renderer 2 is realized by a computer device executing a program, or the like, to reproduce contents. The computer device used for the renderer 2 may be the identical or a different computer device the application 1 uses.

In the case of receiving the application reproduction request message from the application 1, the renderer 2 transmits to the DRM client 3 a message (hereinafter referred to as a renderer reproduction request message; see FIG. 6 below) requesting a transmission of a contents key, which is required for a contents reproduction. The renderer 2 receives the contents key from the DRM client 3 when the DRM client responds to the renderer reproduction request message. The renderer 2 decrypts the contents using the contents key, and reproduces the contents. When the contents reproduction starts, the renderer 2 transmits to the application 1 a message (hereinafter referred to as a renderer reproduction response message) indicating a control outcome.

When a control request message is transmitted from the application 1, the renderer 2 controls the contents reproduction and transmits to the application 1 a message (hereinafter referred to as a control response message) indicating a control outcome.

When an application termination request message is transmitted from the application 1, the renderer 2 terminates the contents reproduction, transmits to the DRM client 3 a message (hereinafter referred to as a renderer termination request message: see FIG. 7 below) requesting the information related to a license to be updated, and transmits to the application 1 a message (renderer termination response message) indicating the outcome of the termination procedure.

The DRM client 3 is a device for storing a license and managing the license. The DRM client 3 determines whether or not to permit a contents reproduction, and updates the license. The DRM client 3 is realized by a computer device executing a program, or the like, to determine whether or not to permit a contents reproduction, and to update the license. The computer device used for the DRM client 3 may be the identical or a different computer device the application 1 and/or the renderer 2 use.

When the renderer reproduction request message is transmitted from the renderer 2, the DRM client 3 determines whether an object for the requested reproduction is a main resource or a sub resource, locks a license if the object is a main resource. The DRM client does not lock a license if the object is a sub resource. If the license is already locked, neither the renderer 2 nor another renderer is allowed to reproduce the contents using the locked license. Also, when the license is already locked, the computer device is not allowed to transfer the locked license to another terminal or to a recording medium. The DRM client 3 has not only a license but also a flag to indicate whether or not the license is locked. The flag has a value of 0 or 1. 0 indicates a status where a license is not locked. 1 indicates a status where a license is locked. Initially, the flag is set as 0. When locking a license, the DRM client 3, upon confirming that the flag value is 0, sets it as 1. If the flag has been already set as 1, since the license is already locked, a contents reproduction or a license transfer using the license is not permitted. When a license use is terminated, the renderer 2 informs the DRM client 3 that the license use is terminated. In respond thereto, the DRM client 3 sets the flag as 0. It is important to note that a method for locking a license is not limited to the method described above, which is merely an example, and any other commonly known methods for locking a license may be employed.

The DRM client 3 acquires a contents key corresponding to a reproduction request and transmits the contents key to the renderer 2. Hereinafter, a message for transmitting a contents key is referred to as a client reproduction response message (see FIG. 13 below).

When a renderer termination request message is transmitted from the renderer 2, the DRM client 3 updates a use condition of a license, releases the lock, and transmits to the renderer 2 a message (hereinafter referred to as a client termination response message) reporting that the reproduction is terminated.

Hereinafter, for a concise description, the application 1, the renderer 2 and the DRM client 3 will be described as if they are realized by separate computer devices. However, the application 1, the renderer 2 and the DRM client 3 may be realized as a software by causing a single general purpose CPU to execute a program for realizing the respective operations or as a hardware. That is, if the application 1, the renderer 2 and the DRM client 3 are realized so as to have functions as described below, they may be realized by software or hardware.

Figure 2:
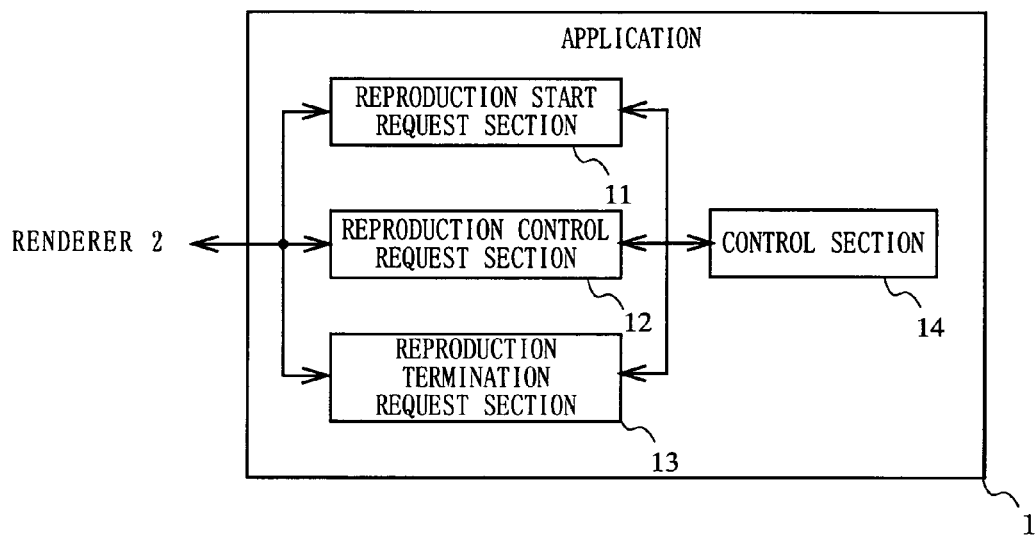
FIG. 2 is a block diagram showing a functional configuration of an application 1.

FIG. 2 is a block diagram showing a functional configuration of the application 1. In FIG. 2, the application 1 includes a reproduction start request section 11, a reproduction control request section 12, a reproduction termination request section 13 and a control section 14.

The control section 14 controls an entire operation of the application 1. The control section 14 determines whether to start a contents reproduction, to control a contents reproduction or to terminate a contents reproduction, and gives an instruction to each of the reproduction start request section 11, the reproduction control request section 12 and the reproduction termination request section 13 to transmit a message accordingly with the determination outcome.

When a contents reproduction is required, the reproduction start request section 11 generates an application reproduction request message, and transmits the application reproduction request message to the renderer 2.

Figure 3:
FIG. 3 is a diagram showing a data structure of an application reproduction request message.

FIG. 3 is a diagram showing a data structure of the application reproduction request message. The application reproduction request message contains a contents URI, a license ID and a resource ID. Here, the contents URI means a URI (Uniform Resource Identifier) identifying a location where the contents of the reproduction object are stored. The license ID means an identifier for identifying the contents license of the reproduction object. The resource ID means an identifier for identifying a resource of a reproduction object.

The reproduction start request section 11, after transmitting the application reproduction request message, receives the renderer reproduction response message replied from the renderer 2, analyzes the contents and reports the analysis outcome to the control section 14.

When a control for a contents reproduction is required, the reproduction control request section 12 generates a control request message and transmits the message to the renderer 2. The control request message contains a license ID and control information. Here, the license ID means a license ID of a resource being reproduced. The control information means the control contents indicating a manner in which a reproduction is performed. After transmitting the control request message, the reproduction start request section 11 receives a control response message replied from the renderer 2, analyzes the contents and reports the analysis outcome to the control section 14.

When a termination for a contents reproduction is required, the reproduction termination request section 13 generates an application termination request message and transmits the message to the renderer 2.

Figure 4:
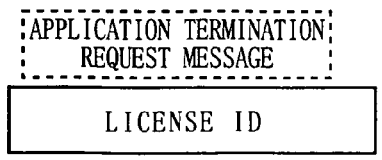
FIG. 4 is a diagram showing a data structure of an application termination request message.

FIG. 4 is a diagram showing a data structure of the application termination request message. The message contains a license ID of a resource that is being reproduced. The reproduction termination request section 13 receives, after transmitting the application termination request message, a renderer termination response message replied from the renderer 2, analyzes the contents and reports the analysis outcome to the control section 14.

Figure 5:
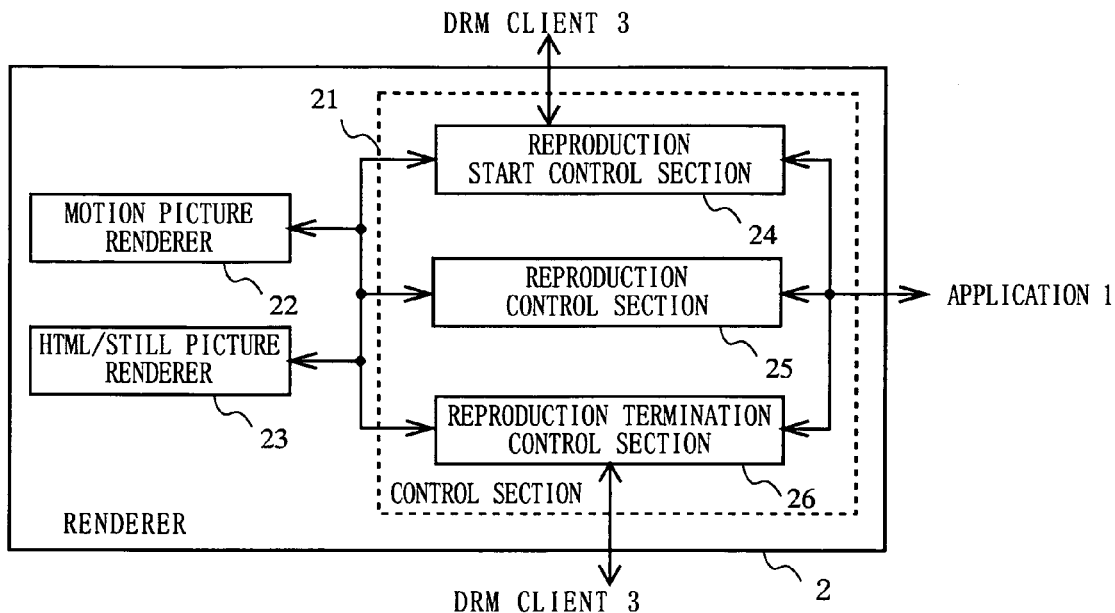
FIG. 5 is a block diagram showing a functional configuration of a renderer 2.

FIG. 5 is a block diagram showing a functional configuration of the renderer 2. In FIG. 5, the renderer 2 comprises a control section 21, a motion picture renderer 22 and an HTML/still picture renderer 23. The control section 21 includes a reproduction start control section 24, a reproduction control section 25 and a reproduction termination control section 26. Note, although the motion picture renderer 22 and the HTML/still picture renderer 23 are set within the renderer 2 here, the motion picture renderer 22 and the HTML/still picture renderer 23 may be set outside the renderer 2, or either one of the motion picture renderer 22 or the HTML/still picture renderer 23 may be set inside the renderer 2.

When the application reproduction request message is transmitted from the application 1, the reproduction start control section 24 analyzes the contents, generates a renderer reproduction request message, and transmits the message to the DRM client 3.

Figure 6:
FIG. 6 is a diagram showing a data structure of a renderer reproduction request message.

FIG. 6 is a diagram showing a data structure of the renderer reproduction request message. The renderer reproduction request message contains a license ID and a resource ID. The license ID and the resource ID contained in the renderer reproduction request message are identical to those contained in the application reproduction request message.

The reproduction start control section 24, after transmitting the renderer reproduction request message, receives a client reproduction response message replied from the DRM client 3, and acquires a resource classification, a contents key and a use condition of a renderer. The reproduction start control section 24 determines whether the resource is a motion picture, HTML or a still picture. To have the resource decrypted and reproduced, if the resource is a motion picture, the reproduction start control section 24 gives the contents key and the use condition of the renderer to the motion picture renderer 22, and, if the resource is either HTML or a still picture, the reproduction start control section 24 gives the contents key and the use condition of the renderer to the HTML/still picture renderer 23. Then, the reproduction start control section 24 generates a renderer reproduction response message and transmits the message to the application 1. It is important to point out that if the resource is a sub resource, even when the resource is a motion picture, neither a license lock nor a license update at an end of the reproduction is to be performed.

When a control request message is transmitted from the application 1, the reproduction control section 25 analyzes the contents, controls the contents reproduction, generates a control response message and transmits the control response message to the application 1.

When the application termination request message is transmitted from the application 1, the reproduction termination control section 26 analyzes the contents and causes the motion picture renderer 22 or the HTML/still picture renderer 23 to terminate a contents reproduction. In a case where the contents of the termination object are a main resource, the reproduction termination control section 26 acquires a use condition of the contents, which is managed by the motion picture renderer 22, generates a renderer termination request message, and transmits the renderer termination request message to the DRM client 3 to request a license update.

Figure 7:
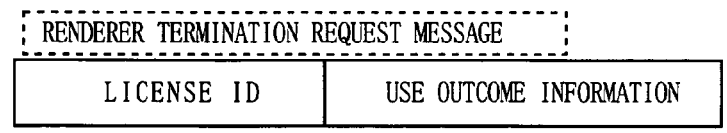
FIG. 7 is a diagram showing a data structure of a renderer termination request message.

FIG. 7 is a diagram showing a data structure of the renderer termination request message. The renderer termination request message contains a license ID and use outcome information. Here, the license ID is identical to the license ID specified for the application termination request message. The use outcome information is information indicating a manner in which reproduced contents are to be used.

Figure 8:
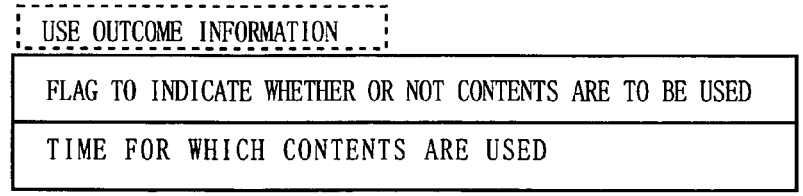
FIG. 8 is a diagram showing a data structure of use outcome information.

FIG. 8 is a diagram showing a data structure of the use outcome information. The use outcome information contains a flag indicating whether or not contents are to be used, and a period for which the contents are used.

In a case where contents of the termination object are a sub resource, the reproduction termination control section 26 causes the HTML/still picture renderer 23 to terminate the reproduction without generating a renderer termination request message.

Figure 9:
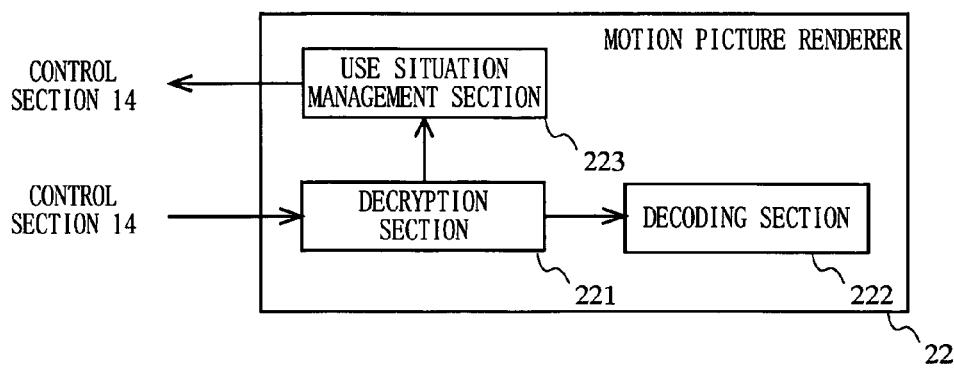
FIG. 9 is a block diagram showing a functional configuration of a motion picture renderer 22.

The motion picture renderer 22 decrypts a main resource and then reproduces the main resource. FIG. 9 is a block diagram showing a functional configuration of the motion picture renderer 22. In FIG. 9, the motion picture renderer 22 includes a decryption section 221, a decoding section 222 and a use situation management section 223. The motion picture renderer 22 is required to operate at a high speed since the motion picture renderer 22 needs to decrypt a main resource in order to reproduce the main resource. Therefore, the motion picture renderer 22 may be realized by a hardware dedicated thereto.

Using a contents key given by the reproduction start control section 24, the decryption section 221 decrypts a main resource and sends the decrypted resource to the decoding section 222. The decoding section 222 reproduces the main resource decrypted by the decryption section 221. An illustration of a process in which the decryption section 221 acquires contents from the contents storing section is omitted (the illustration of contents acquisition from the contents storing section by another section is also omitted).

Further, the decryption section 221 registers information regarding a use situation of contents in the use situation management section 223. Here, the information regarding the use situation of contents, which is to be registered, is information regarding whether or not contents are used (decrypted), and a period of time for which the contents are used. The use situation management section 223 stores a use situation of a main resource in accordance with the instruction from the decryption section 221.

Figure 10:
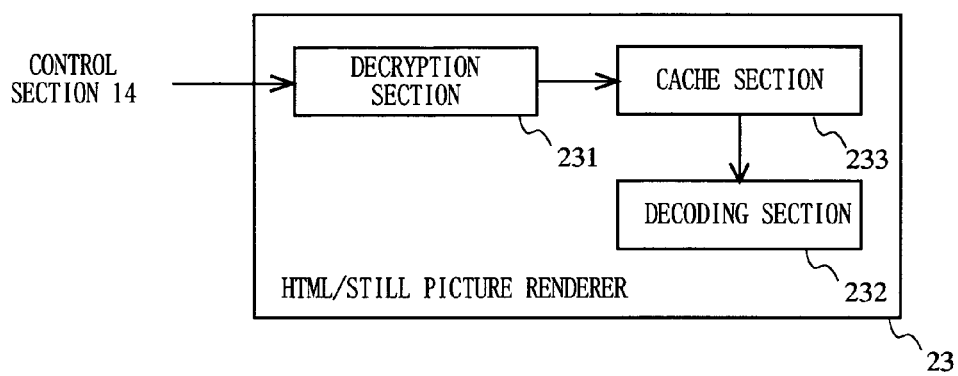
FIG. 10 is a block diagram showing a functional configuration of an HTML/still picture renderer 23.

The HTML/still picture renderer 23 decrypts a sub resource and then reproduces the sub resource. FIG. 10 is a block diagram showing a functional configuration of the HTML/still picture renderer 23. In FIG. 10, the HTML/still picture renderer 23 includes a decryption section 231, a decoding section 232 and a cache section 233.

The decryption section 231 decrypts a sub resource using a contents key sent by the reproduction start control section 24, and stores the decrypted sub resource in the cache section 233. A sub resource such as a menu screen is structured data such as HTML, and thus is normally related to tens to several hundreds of PNG (Portable Network Graphics) files or the like, such as a button. Under the situation mentioned above, performing a DRM operation and decryption operation for each related file increases an operational burden for the application, renderer and DRM client. Further, due to an augmentation in the length and the size of download files and a resource list for a DRM information file, inefficient access to a resource may occur. Therefore, according to the present embodiment, all the sub resources comprising multimedia contents are Zip-compressed, or the like, and are then encrypted. This means that according to the present embodiment, multimedia contents contain a main resource and all the sub resources (hereinafter referred to as an EZP file) that are Zip-compressed, both of which are encrypted. Therefore, the decryption section 231 decrypts the EZP file contained in the multimedia contents, extracts the EZP file, and then temporarily stores all the sub resources, which are extracted, in the cache section 233.

The decoding section 232 acquires the decrypted sub resources stored in the cache section 233 for reproduction. Since each sub resource is a structured data such as HTML, the decoding section 232 is typically realized by a software such as a browser.

Figure 11:
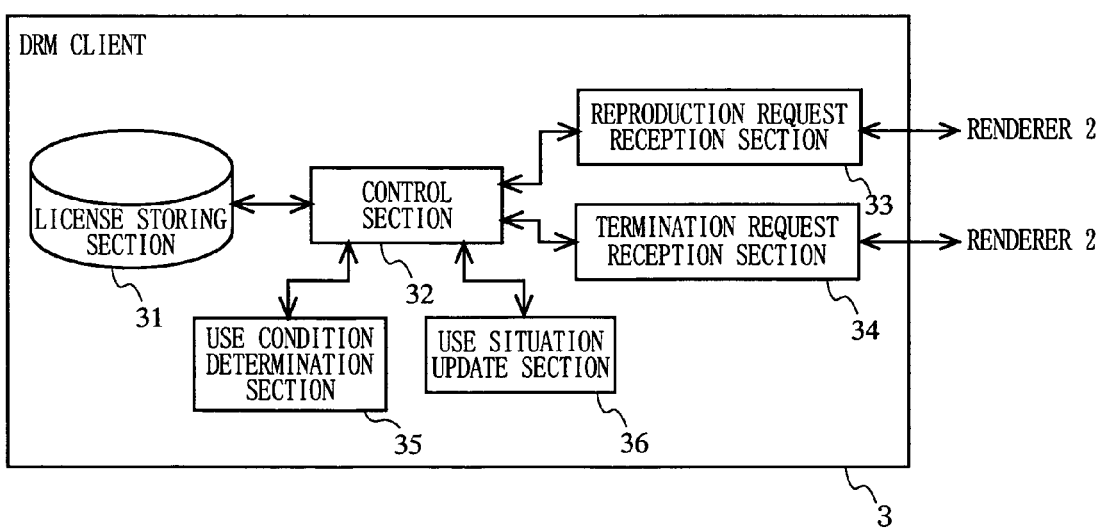
FIG. 11 is a block diagram of a functional configuration of a DRM client 3.

FIG. 11 is a block diagram showing a functional configuration of the DRM client 3. In FIG. 11, the DRM client 3 includes a license storing section 31, a control section 32, a reproduction request reception section 33, a termination request reception section 34, a use condition determination section 35 and a use situation update section 36.

The license storing section 31 is a recording medium for storing a license. FIG. 12 is a diagram showing a data structure of a license. As shown in FIG. 12, the license contains license information and use situation information.

In the license information, a use condition for each resource is set in units per resource. The license information includes a license ID, a validity period, an ID of a user to be permitted and use condition information. The license ID is an identifier of the license. The validity period indicates a period of time in which the license is valid. The ID of a user to be permitted is an identifier of a user granted with the license. The use condition information indicates a condition for using the license.

The use condition information includes common condition information, main resource use condition information, and a sub resource use condition information group containing at least one sub resource use condition information.

The common condition information indicates a common condition between a main resource and a sub resource. The common condition includes information related to a country in which the contents use is permitted, information related to limitation on analogue output as a renderer use condition, information related to whether or not quality conversion during a reproduction is permitted, and the like. The main resource use condition information indicates a condition for when a main resource is used.

The main resource use condition information includes a contents ID, a resource ID, a contents key, a use-enabled period, a use-enabled relative period, a number of use-enabled times and a use-enabled time. Here, the contents ID indicates a URI of contents corresponding to a license. The resource ID is an identifier of the main resource. According to the present embodiment, different sequences are employed between the main resource use condition information and the sub resource use condition information. Therefore, by referring to a sequence by which a resource ID is stored, a main resource and a sub resource can be distinguished from one another. The contents key is a key to decrypt a main resource. The use-enabled period indicates a last day of the period in which a use of a main resource is permitted. The use-enabled relative period indicates a condition such as the number of days in which a use is permitted beginning from an initial day. By referring to a use time and date contained in the use situation information described below, it can be determined whether or not a current use time and date exceeds the use-enabled relative period. The number of use-enabled times indicates a maximum number of times a main resource may be used. The use-enabled time indicates a maximum period of time a main resource may be used.

The sub resource use condition information includes a contents ID, a resource ID, a contents key and reference information. Here, the contents ID indicates a URI of contents corresponding to a license. The resource ID indicates an identifier of a sub resource. The contents key is a key for decrypting the sub resource. In the reference information, information indicating whether or not to refer to a use condition of a main resource is stored. In the case where it is specified in the reference information that use condition information of the main resource needs to be referred to, a sub resource may use contents if the sub resource satisfies the main resource use condition. Such reference information is provided so that, when a use of a main resource becomes impossible, a use of a sub resource becomes impossible simultaneously. For a sub resource, which is required to be used, the reference information specifies that the use condition of the main resource needs not be referred to even after a use of a main resource becomes impossible.

The use situation information is an updateable area. In the use situation information, the past use situation of contents (information indicating a degree to which contents are used) is stored. Specifically, the use situation information includes a use time and date, a number of times used, and a use time. The use time and date indicates a first time and date when contents are used. The number of times used indicates a total number of times contents are used in the past. The use time indicates a total time for which contents are used in the past.

The reproduction request reception section 33 receives a renderer reproduction request message from the renderer 2, and provides the control section 32 with a license ID and a resource ID specified by the renderer reproduction request message. In response thereto, the control section 32 determines, based on a sequence the resource ID is stored, whether the resource corresponding to the resource ID is a main resource or a sub resource. In the case of a main resource, the control section 32 locks a license, acquires a corresponding contents key from the license storing section 31, causes the use condition determination section 35 to generate a renderer use condition, generates a client reproduction response message and causes the reproduction request reception section 33 to transmit the client reproduction response message to the renderer 2. Contrarily, in the case of a sub resource, the control section 32, without locking a license, acquires a contents key from the license storing section 31, causes the use condition determination section 35 to generate a renderer use condition, generates a client reproduction response message, and causes the reproduction request reception section 33 to transmit the client reproduction response message to the renderer 2.

FIG. 13 is a diagram showing a data structure of the client reproduction response message. The client reproduction response message includes a resource classification, a contents key and renderer use condition information. The resource classification is information indicating a main resource or a sub resource. The contents key is a key for decrypting a main resource or the sub resource. The renderer use condition information indicates a condition for decryption performed by the renderer 2.

FIG. 14 is a diagram showing a data structure of the renderer use condition information. The renderer use condition information is set with a time upto an expiry period, information indicating whether or not quality conversion during a reproduction is permitted, information indicating whether or not to give a limitation on an analogue output, a total time in which a use of contents is permitted, and information indicating whether or not there is a limitation given to the number of times used.

The termination request reception section 34 receives a renderer termination request message from the renderer, and provides the control section 32 with a license ID and use outcome information specified by the message. In response thereto, the control section 32 supplies the use outcome information to the use situation update section 36 to cause the use situation update section 36 to determine a manner in which the use situation information of the license stored in the license storing section 31 is updated, and, based on the determination outcome, updates the use situation information of the license stored in the license storing section 31. Then, the control section 32 generates a client termination response message and causes the termination request reception section 34 to transmit the message to the renderer 2.

Figure 15:
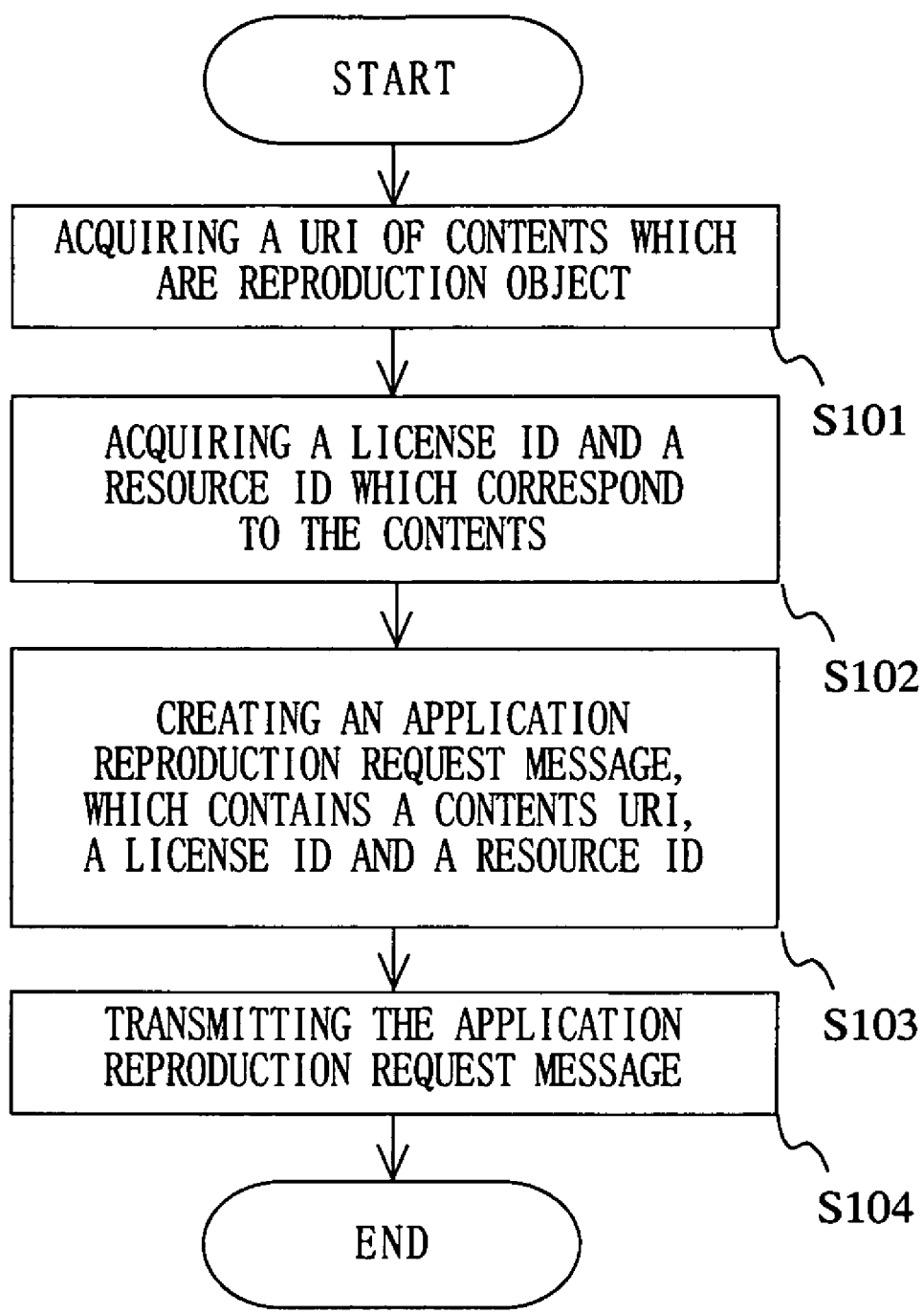
FIG. 15 is a flowchart showing an operation of the application 1 when the application 1 makes a request for a contents reproduction to the renderer 2.

FIG. 15 is a flowchart showing an operation of the application 1 when the application 1 makes a request to the renderer 2 for a contents reproduction. Hereinafter, an operation of the application 1 when the application 1 makes a request for a contents reproduction will be described with reference to FIG. 15.

First, the reproduction start request section 11 of the application 1 acquires a URI of the contents that are reproduction object, from the contents storing section where the contents are stored (step S101). Next, the reproduction start request section 11 acquires a license ID and a resource ID each corresponding to the contents from the contents storing section (step S102). Then, the reproduction start request section 11 generates an application reproduction request message by using the contents URI, the license ID and the resource ID, all of which are acquired in the aforementioned step (step S103), transmits the application reproduction request message to the renderer 2 (step S104), and ends the process.

Figure 16:
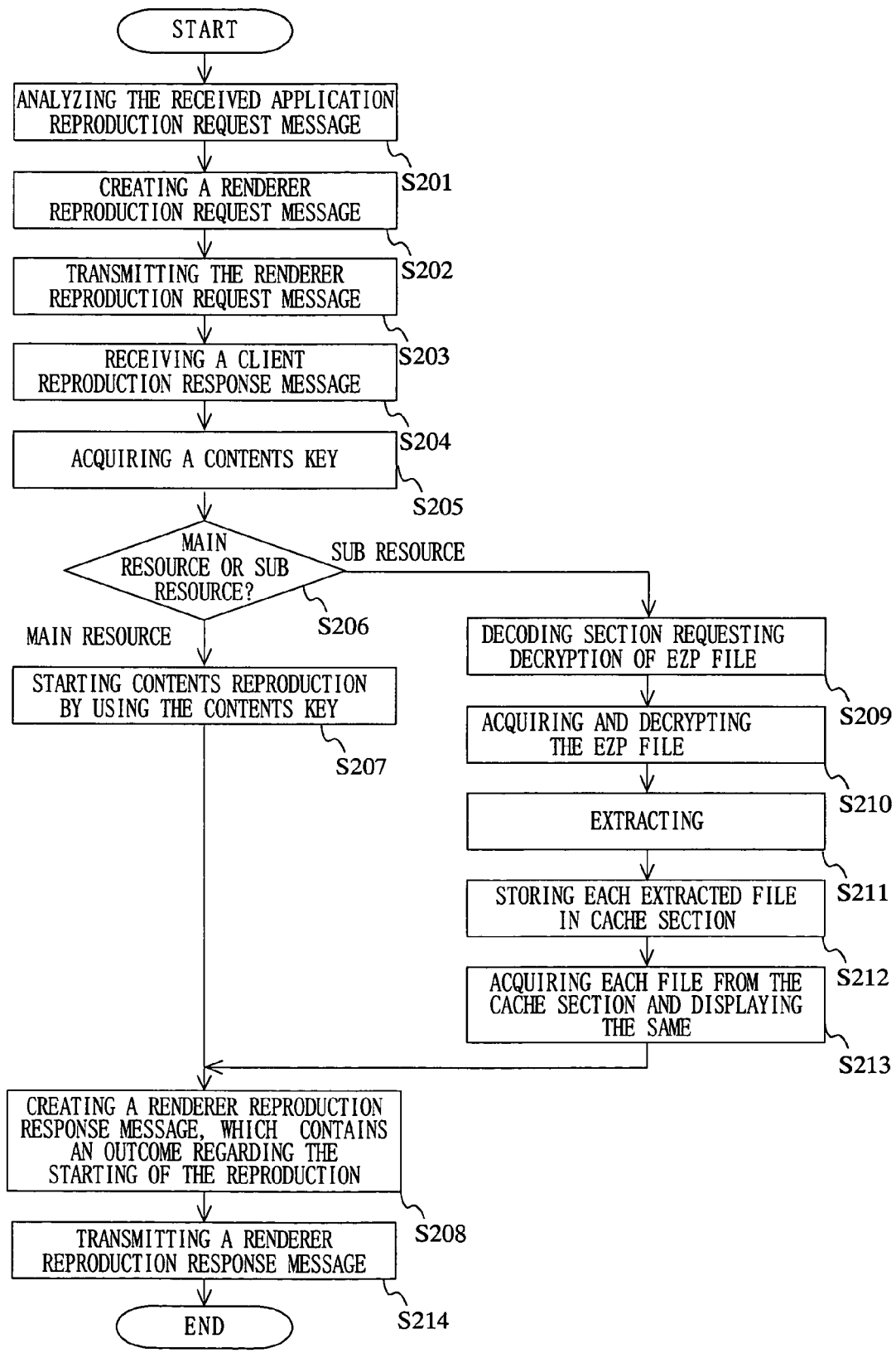
FIG. 16 is a flowchart showing an operation of the renderer 2 when there is a reproduction request from the application 1.

FIG. 16 is a flowchart showing an operation of the renderer 2 when there is a reproduction request from the application 1. Hereinafter, the operation of the renderer 2 when there is a reproduction request from the application 1 will be described with reference to FIG. 16.

First, the reproduction start control section 24 of the renderer 2 analyzes an application reproduction request message transmitted from the application 1, and acquires a license ID and a resource ID (step S201). Next, the reproduction start control section 24, by using the acquired license ID and the resource ID, generates a renderer reproduction request message (step S202), and transmits the renderer reproduction request message to the DRM client 3 (step S203).

Next, the reproduction start control section 24 receives a client reproduction response message transmitted from the DRM client 3 (step S204), and acquires a contents key (step S205). Then, the reproduction start control section 24 determines, by referring to a resource classification contained in the client reproduction response message, whether the acquired contents key is for a main resource or for a sub resource (step S206).

When the contents key is for a main resource, the reproduction start control section 24 transmits the acquired contents key to the motion picture renderer 22. Upon receiving the contents key, the motion picture renderer 22 acquires contents from the contents storing section, decrypts the contents using the contents key, starts a reproduction (step S206), and advances to step S208.

On the other hand, when the contents key is for a sub resource, the decoding section 232 of the HTML/still picture renderer 23 makes a request to the decryption section 231 for a decryption of an EZP file (step S209). In response thereto, the decryption section 231 acquires the EZP file from the contents storing section and decrypts the EZP file using the contents key acquired in step S205 (step S210). Next, the decryption section 231 extracts the decrypted EZP file (step S211). Thereby, all the sub resources such as the HTML file and the PNG file contained in the EZP file are extracted. Next, the decryption section 231 stores each extracted file in the cache section 233 (step S212). Thereafter, the decoding section 232 acquires each file stored in the cache section 233, displays the sub resources (step S213), and advances to step S208. Each extracted file stored in the cache section 233 is, after a predetermined period of time, subject to be deleted by the decoding section 232. If there is a reproduction request from the application 1 after the sub resources stored in the cache section 233 are deleted, the decryption section 231 performs the operations of steps S209 through S213 again. On the other hand, when a sub resource is stored in the decoding section 232, the decryption section 231 omits the operations of steps S209 through S213.

In step S208, the reproduction start control section 24 generates a renderer reproduction response message containing an outcome related to a starting a reproduction. During the step, the reproduction start control section 24 creates, when a contents key is acquired and the contents reproduction is begun properly, a renderer reproduction response message reporting of success of the reproduction. Contrarily, if acquisition of the contents key fails and thereby the contents reproduction does not start successfully, the reproduction start control section 24 generates a renderer reproduction response message reporting of failure of the reproduction.

Then, the reproduction start control section 24 transmits the generated renderer reproduction response message to the application 1 (step S214) and ends the process. In response thereto, the application 1 appreciates whether or not the reproduction has been performed.

Figure 17:
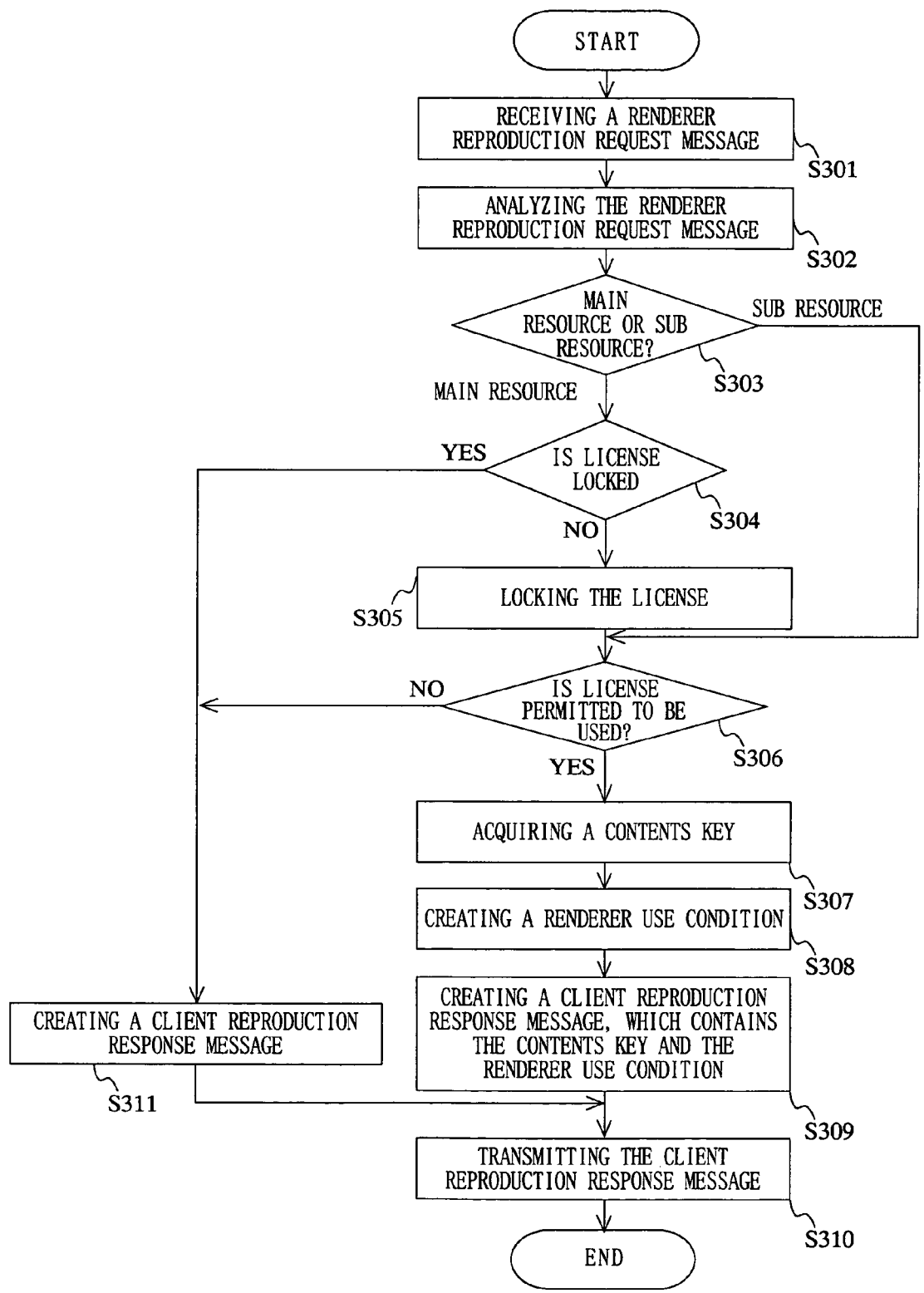
FIG. 17 is a flowchart showing an operation of the DRM client when there is a reproduction request to the DRM client 3 from the renderer 2.

FIG. 17 is a flowchart showing an operation of the DRM client when there is a reproduction request from the renderer 2 to the DRM client 3. Hereinafter, the operation of the DRM client 3 when there is a reproduction request from the renderer 2 will be described with reference to FIG. 17.

First, the reproduction request reception section 33 of the DRM 3 receives a renderer reproduction request message (step S301). Next, the reproduction request reception section 33 analyzes the received renderer reproduction request message, and provides the control section 32 with a license ID and a resource ID contained in the message (step S302).

Next, the control section 32 determines whether a resource corresponding to the provided resource ID is a main resource or a sub resource (step S303). In the case of a sub resource, the control section 32 advances, without locking a license, to an operation of step S306. On the other hand, in the case of a main resource, the control section 32 determines whether or not a license is locked (step S304).

In step S304, in the case where it is determined that the license is locked, the control section 32 advances to an operation of step S311 without acquiring a contents key, generates a client reproduction response message reporting that the license is locked, and advances to an operation of step S310. On the other hand, in a case where it is determined that the license is not locked, the control section 32 locks the license (step S305) and determines whether or not a use of the license is possible (step S306).

To determine whether or not a use of a license is possible, a use time and date, a number of times used, and a use time of the use situation information stored in the license may be compared with a use-enabled period, the number of use-enabled times and a use-enabled time stored in a main resource use condition information. For example, regarding whether or not a use of a main resource is possible, if a use time and date exceeds a use-enabled period, the control section 32 determines that a use of the main resource is not possible. Also, if a number of times used exceeds a number of use-enabled times, the control section 32 determines that a use of a license is not possible. If a use time exceeds a use-enabled time, the control section 32 determines that a use of the license is not possible. Regarding whether or not a use of a sub resource is possible, if it is specified in reference information that main resource use condition information needs to be referred to, the control section 32 determines whether or not a use of a license is possible by comparing specified use condition information with use situation information of the main resource. On the other hand, if it is not specified in the reference information that main resource use condition information needs to be referred to, the control section 32 determines that a use of the license is possible.

If it is determined in step S306 that a use of a license is not possible, the control section 32 advances to an operation of step S309 without acquiring a contents key. On the other hand, if it is determined that a use of a license is possible, the control section 32 advances to an operation of step S307.

In step S307, the control section 32 acquires a contents key corresponding to the resource ID from the license storing section 31. Next, the control section 32 generates a renderer use condition (step S308) and advances to an operation of step S309. The control section 32, by comparing use situation information with main resource use condition information, both of which are stored in the license, calculates a time up to an end of a validity period, a total amount of time for the contents use (remaining time) and the remaining number of times used so as to determine whether or not a limitation is given to the number of times used. Further, the control section 32 determines, with referring to the common information, whether or not quality conversion during a reproduction is permitted and a limitation on an analogue output is given to create a renderer use condition.

In step S309, the control section 32 creates a client reproduction response message containing the acquired contents key and the generated renderer use condition. In response thereto, the reproduction start control section 24 transmits the created client reproduction response message to the renderer 2 (step S310), and ends the process.

Figure 18:
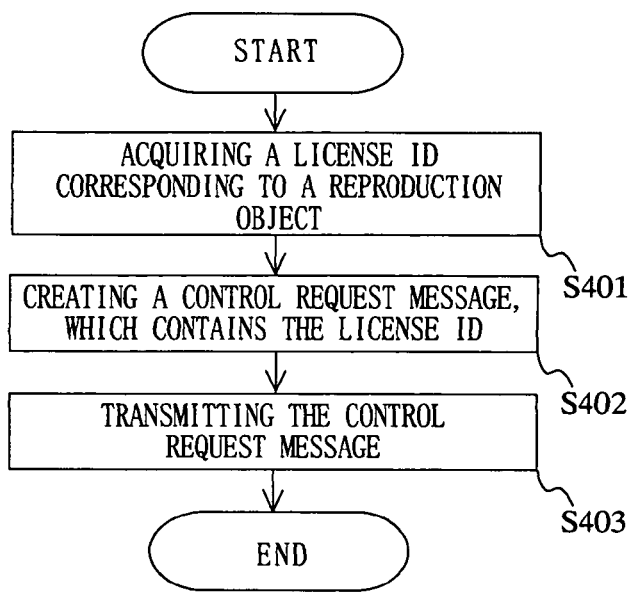
FIG. 18 is a flowchart showing an operation of the application 1 when the application makes a request for a control of a contents reproduction to the renderer 2.

FIG. 18 is a flowchart showing an operation of the application 1 when the application 1 makes a request to the renderer 2 for a control of a contents reproduction. Hereinafter, the operation of the application 1 when the application 1 makes a request for a control of a contents reproduction will be described with reference to FIG. 18.

First, the reproduction control request section 12 of the application 1 acquires a license ID corresponding to contents of a reproduction object (step S401). Next, the reproduction control request section 12 generates a control request message containing the information indicating the acquired license ID and the control contents (step S402), transmits the control request message to the renderer 2 (step S403), and ends the process.

Figure 19:
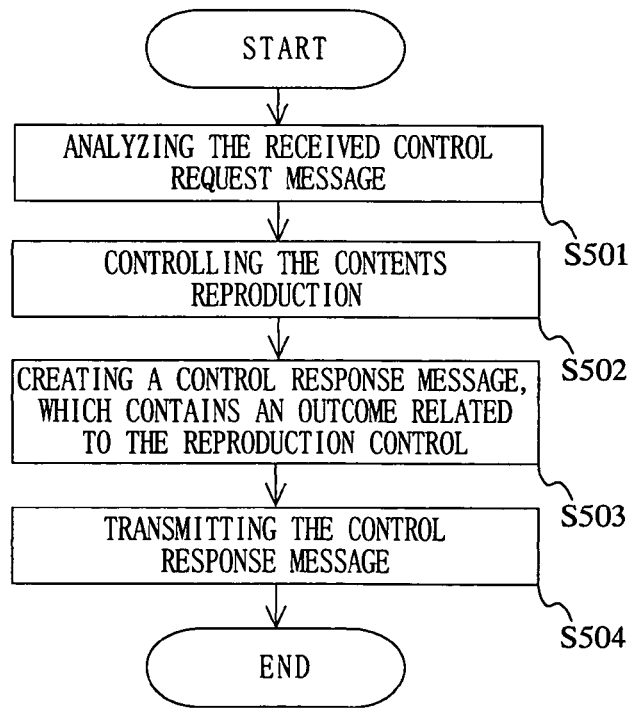
FIG. 19 is a flowchart showing an operation of the renderer 2 when there is a reproduction control request from the application 1.

FIG. 19 is a flowchart showing an operation of the renderer 2 when there is a reproduction control request from the application 1. Hereinafter, the operation of the renderer 2 when there is a reproduction control request will be described with reference to FIG. 19.

First, the reproduction control section 25 of the renderer 2 analyzes the contents of the received control request message to recognize a resource of the control object and the substance of control (e.g., a pause, a fast-forward, a rewind, etc) (step S501). Next, the reproduction control section 25 of the renderer 2 sends an instruction to the motion picture renderer 22 or to the HTML/still picture renderer 23, both of which are reproducing the resource of the recognized control object, to control the reproduction based on the recognized control contents (step S502). In response thereto, the motion picture renderer 22 or the HTML/still picture renderer 23 controls the contents reproduction.

Next, the reproduction control section 25 generates a control response message indicating an outcome regarding the reproduction control (step S503), transmits the control response message to the application 1 (step S504), and ends the process.

Figure 20:
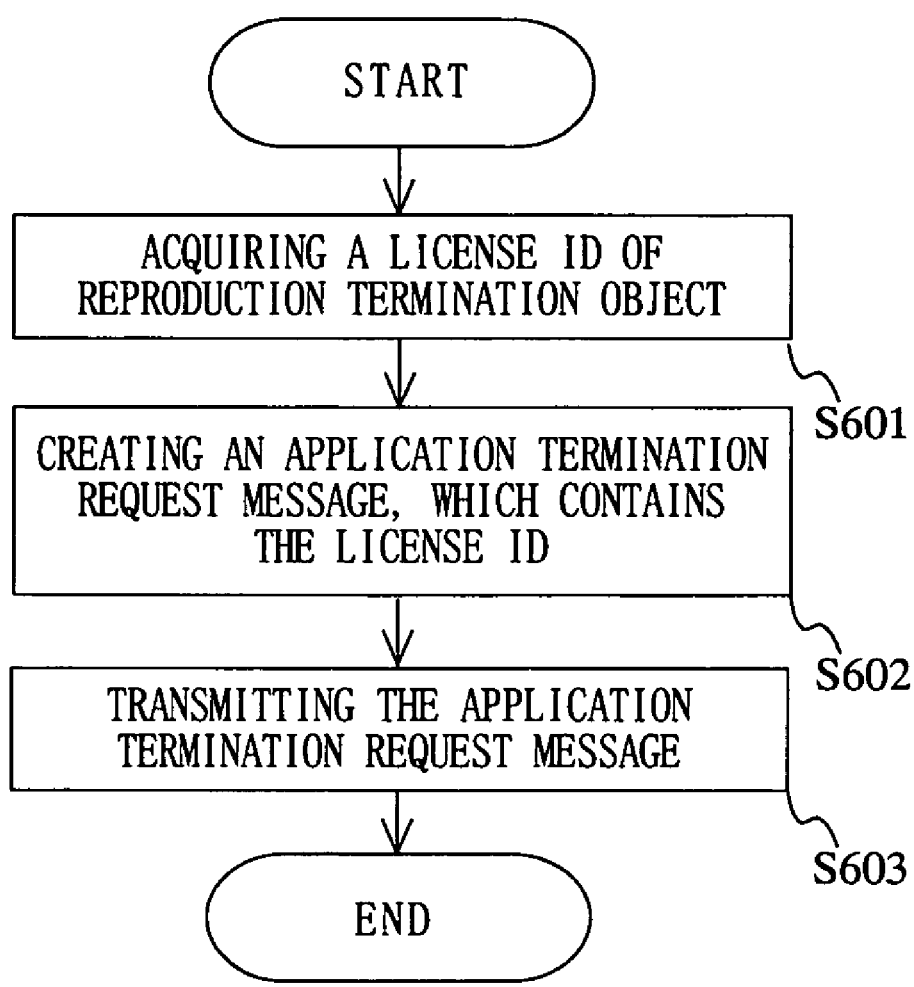
FIG. 20 is a flowchart showing an operation of the application 1 when the application 1 makes request for a termination of a contents reproduction to the renderer 2.

FIG. 20 is a flowchart showing an operation of the application 1 when the application 1 makes a request to the renderer 2 for a termination of a contents reproduction. Hereinafter, the operation of the application 1 when the application 1 makes a request for a termination of a contents reproduction will be described with reference to FIG. 20.

First, a reproduction termination request section 13 of the application 1 acquires, by referring to the contents storing section, a license ID corresponding to contents of a reproduction termination object (step S601). Next, the reproduction termination request section 13 generates an application termination request message including the acquired license ID (step S602), transmits the application termination request message to the renderer 2 (step S603), and ends the process.

Figure 21:
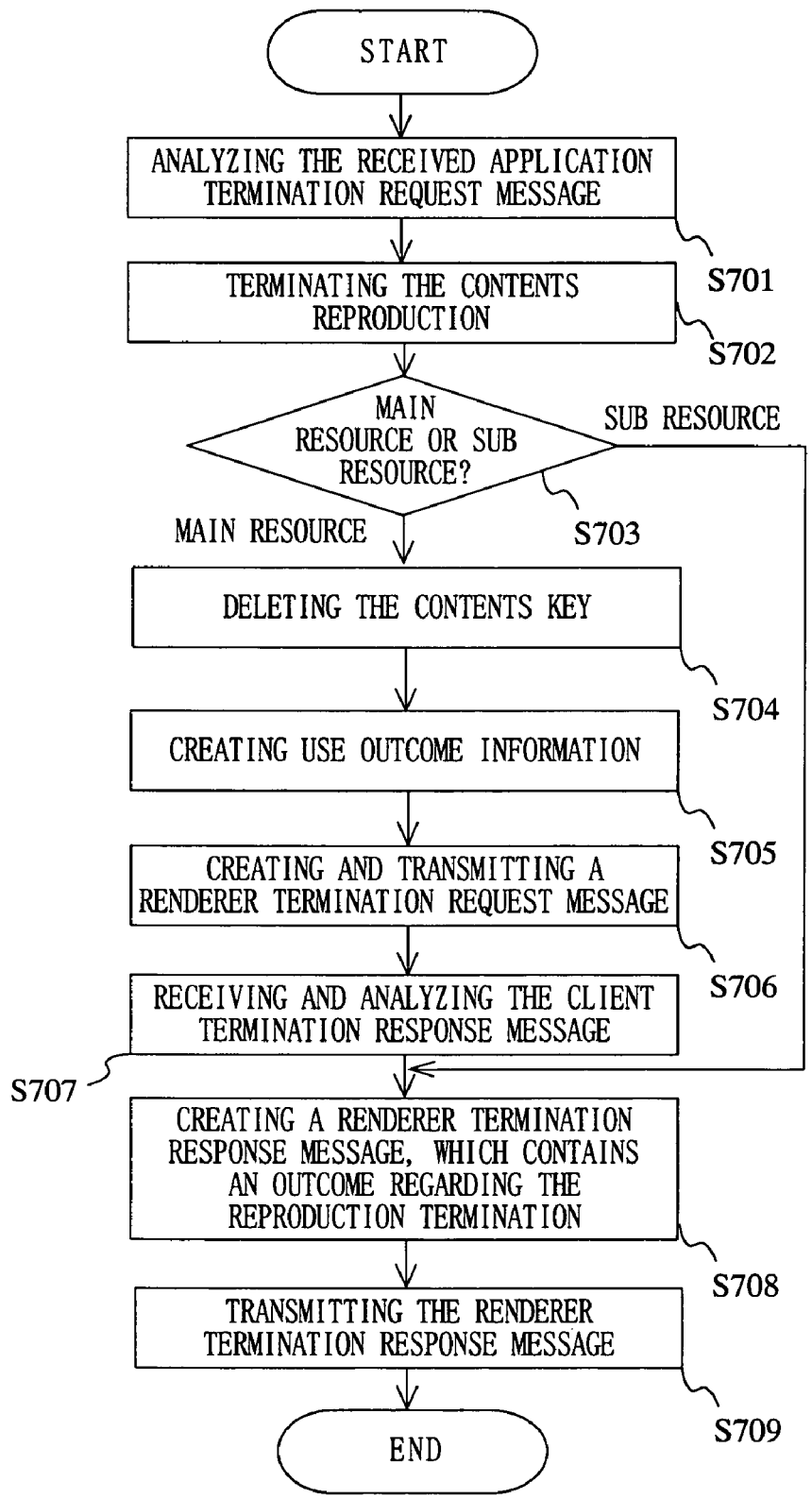
FIG. 21 is a flowchart showing an operation of the renderer 2 when there is a reproduction termination request from the application 1 or when contents are reproduced until an end.

FIG. 21 is a flowchart showing an operation of the renderer 2 when there is a reproduction termination request from the application 1, or when contents are reproduced until an end. Hereinafter, the operation of the renderer 2 when there is a reproduction termination request or when contents are reproduced until an end will be described with reference to FIG. 21.

First, a reproduction termination control section 26 of the renderer 2 receives an application termination request message from the application 1, analyzes the contents (step S701) and terminates a reproduction of contents corresponding to a specified license ID (step S702). At this time, the reproduction termination control section 26 sends an instruction to the motion picture renderer 22 or the HTML/still picture renderer 23 to terminate the reproduction. If the reproduction is carried out until an end, operations of the steps S701 and S702 are omitted.

Next, the reproduction termination control section 26 determines whether the contents, whose reproduction is terminated, are a main resource or a sub resource (step S703). In the case of a sub resource, the reproduction termination control section 26 advances to an operation of step S707. On the other hand, in the case of a main resource, the reproduction termination control section 26 advances to an operation of step S704.

In step S704, the reproduction termination control section 26 deletes the contents key of the terminated contents. Next, the reproduction termination control section 26 determines, based on information stored in the use situation management section 223, whether or not the contents has been used, calculates a time in which the contents are used, and generates use outcome information (step S705). Next, the reproduction termination control section 26 generates, based on the license ID and the use outcome information, a renderer termination request message and transmits the message to the DRM client (step S706).

Next, the reproduction termination control section 26 receives and analyzes a client termination response message transmitted from the DRM client as a response to the renderer termination request message (step S707), and advances to an operation of step S708.

In step S708, the reproduction termination control section 26 generates a renderer termination response message containing an outcome regarding the reproduction termination, transmits the renderer termination response message to the application 1 (step S709) and ends the process.

Figure 22:
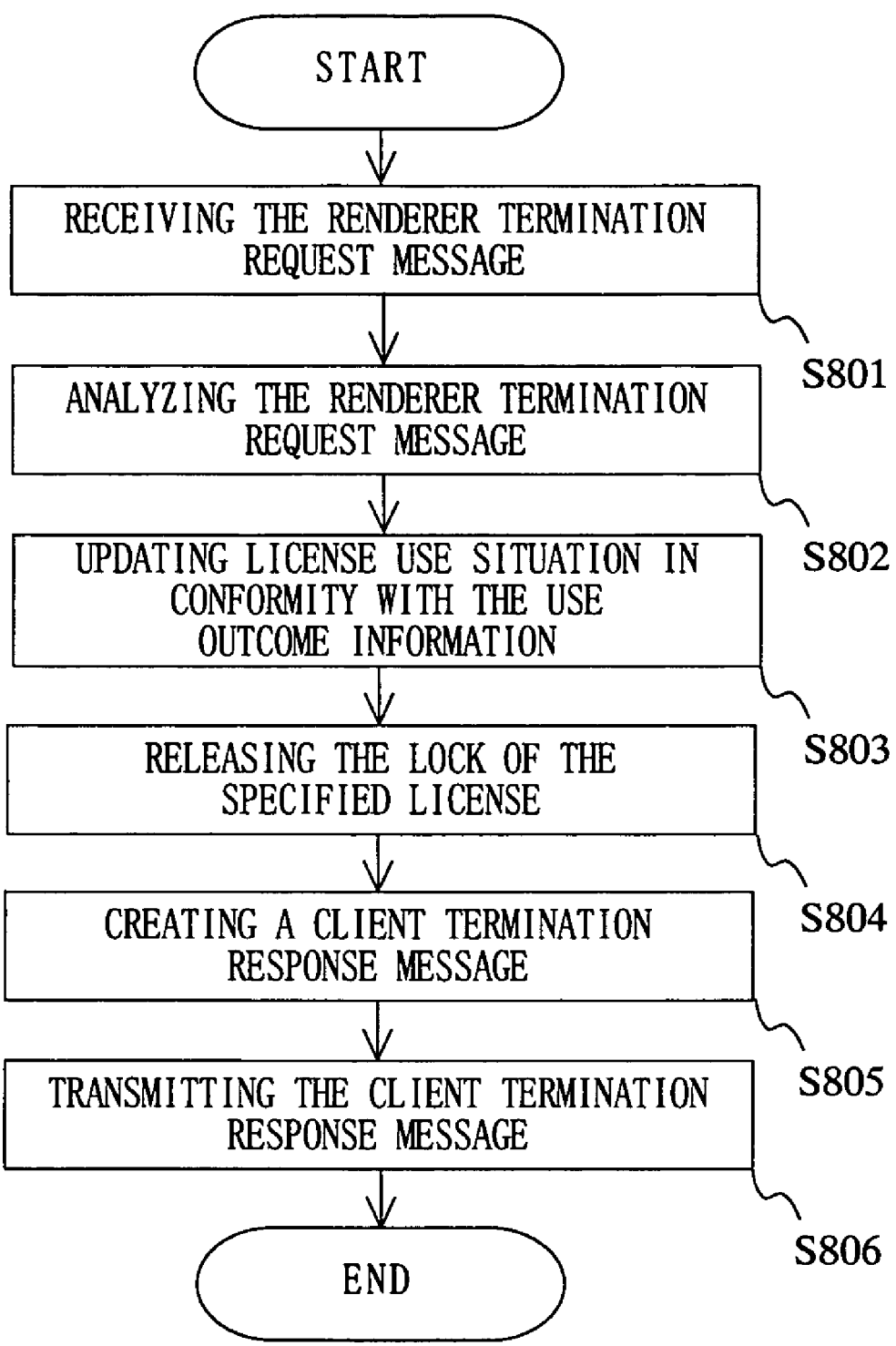
FIG. 22 is a flowchart showing an operation of the DRM client 3 when there is a termination request from the renderer 2.

FIG. 22 is a flowchart showing an operation of the DRM client 3 when there is a termination request from the renderer 2. Hereinafter, the operation of the DRM client 3 when there is a termination request from the renderer 2 will be described with reference to FIG. 22.

First, a termination request reception section 34 of the DRM client 3 receives a renderer termination request message from the renderer 2 (step S801). Next, the termination request reception section 34 analyzes the received renderer termination request message and extracts a license ID and use outcome information to supply the license ID and the use outcome information to the control section 32 (step S802).

Next, the control section 32 recognizes the license of an update object based on the supplied license ID, and causes the use situation update section 36 to update the license use situation information based on the supplied use outcome information (step S803). To be more specific, at this time, the use situation update section 36: increases the number of times used of the use situation information based on a flag indicating whether or not the contents are used as indicated in the use outcome information; increases the use time contained in the use situation information based on a time when the contents are used; and, provided that the use is an initial use, updates the use time and date to the present time and date. The control section 32 overwrites and saves the license, whose use situation information is updated by the use situation update section 36, in the license storing section 31.

Next, the control section 32 releases the lock of the license corresponding to the license ID (step S804). Next, the control section 32 creates a client termination response message (step S805), transmits the message to the renderer 2 (step S806) and ends the process.

Thus, according to the aforementioned embodiment, multimedia-type contents are divided into a main resource and a sub resource; and a license is managed only for the main resource to solve the trouble of a license being updated, which makes it impossible for a main part of a motion picture to be reproduced when a menu screen, or the like, is used. Therefore, by the aforementioned embodiment, a data structure appropriate for performing rights management of multimedia-type contents, a recording medium storing data of the data structure, a reproduction device and a reproduction method for reproducing the data, are provided.

Further, according to the aforementioned embodiment, all the sub resources are compressed as an EZP file. In the case of reproducing contents, a renderer decrypts the EZP file using a contents key, thereafter extracts the decrypted EZP file, and temporarily stores the extracted file. A decoding section of a browser, or the like, reads each of the temporarily stored files and reproduces a sub resource. The operational load of the renderer is, therefore, lightened. Since, an EZP process module constructed by a decryption section and at a cache section is small in scale, the EZP operation module can be constructed in hardware. Therefore, the EZP operational module (at least the decryption section thereof) can easily be tamper resistant. A decoding section of a browser, or the like, can not easily become tamper resistant, but, by making the EZP operation module (at least the decryption section of it) tamper resistant, exposure of a contents key to the outside is prevented. Also, even in the case where a decryption section is set with software, the decryption section can easily be tamper resistant. Also, extracted sub resources are deleted after a predetermined period of time, and therefore, can resist static attacks. Further, since extracted sub resources are temporarily stored, a decoding section of a browser, or the like, does not need to perform a use completion report when a reproduction is terminated.

Also, though according to the aforementioned embodiment sub resources are compressed, the sub resources do not need to be compressed. In the case where the sub resources are not compressed, the renderer omits the extraction operation of step S211 shown in FIG. 16. Also, though according to the aforementioned embodiment, all the sub resources are decrypted collectively, each sub resource may be individually decrypted. In such case, in steps S209 through S213 shown in FIG. 16, the renderer decrypts the sub resource individually, extracts and caches each sub resource. Also, the renderer may, without caching the sub resources, decrypt and/or extract sub resources for each reproduction.

A multimedia-type contents reproduction device, a reproduction method and a recording medium having stored data used for the same of the present invention, are suited for performing rights management for multimedia-type contents and are useful in the field of contents distribution and the like.

The invention claimed is:

1. A contents reproduction method executed by a contents reproduction apparatus that reproduces content data, the contents reproduction method comprising:

a step of obtaining the content data, the content data including a plurality of resources, the plurality of resources including at least one main resource and including at least one sub resource, such that:

the main resource has a license associated therewith that is required for reproducing the main resource and that needs to be locked when reproducing the main resource;

the main resource is data that includes a main part of contents;

the sub resource is a different entity from the main resource;

the sub resource has a license associated therewith that is required for reproducing the sub resource and that does not need to be locked when reproducing the sub resource;

the sub resource is data that is associated with the main resource and that includes related information associated with the main part of the contents;

the license associated with the main resource and the license associated with the sub resource (i) are stored in a recording medium, (ii) contain license information to which a use situation for each resource of the plurality of resources is set, and (iii) contain a condition for using the license associated with the main resource and the license associated with the sub resource;

a step of obtaining the license information for the content data, the license information being required for reproducing each of the main resource and the sub resource;

a step of reproducing at least one of the main resource and the sub resource;

a step of locking the license associated with the main resource when reproducing the main resource; and a step of (i) during said reproduction of the main resource, determining that a start of reproducing a resource (a) that is different from the main resource being reproduced and (b) that requires the license information for reproduction thereof is not permitted, and (ii) during said reproduction of the sub resource, determining that a start of reproducing a resource (a) that is different from the sub resource being reproduced and (b) that requires the license information for reproduction thereof is permitted.

2. The contents reproduction method according to claim 1, wherein:

the license information includes use state information indicating a use state of the main resource; and the contents reproduction method further comprises:

a step of updating the license information to reflect said reproduction of the main resource in the use state information included therein, the license information being updated when said reproduction of the main resource is finished; and a step of permitting, after said updating, the start of reproducing the resource that has been prohibited by said prohibiting.

3. A contents reproduction device for reproducing content data, the contents reproduction device comprising:

a contents storing memory that stores the content data that includes a plurality of resources, the plurality of resources including at least one main resource and including at least one sub resource, such that:

the main resource has a license associated therewith that needs to be locked when reproducing the main resource;

the main resource is data that includes a main part of contents;

the sub resource is a different entity from the main resource;

the sub resource has a license associated therewith that does not need to be locked when reproducing the sub resource; and the sub resource is data that is associated with the main resource and that includes related information associated with the main part of the contents;

a license storing memory that stores the license associated with the main resource and the license associated the sub resource, the license associated with the main resource and the license associated with the sub resource containing license information to which a use situation for each resource of the plurality of resources is set, for the content data, the license associated with the main resource and the license associated with the sub resource containing a condition for using the license associated with the main resource and the license associated with the sub resource, and the license information being required for reproducing each of the main resource and the sub resource;

a reproducing unit that reproduces at least one of the main resource and the sub resource; and a processor programmed to (i) lock the license associated with the main resource when the main resource is reproduced, (ii) during the reproduction of the main resource by the reproducing unit, determine that a start of reproducing a resource (a) that is different from the main resource being reproduced and (b) that requires the license information for reproduction thereof is not permitted, and (iii) during the reproduction of the sub resource by the reproducing unit, determine that a start of reproducing a resource (a) that is different from the sub resource being reproduced and (b) that requires the license information for reproduction thereof is permitted.

4. The contents reproduction device according to claim 3, wherein:
- the license information includes use state information indicating a use state of the content data; and
- the processor is further programmed to (i) update the license information to reflect the reproduction of the main resource in the use state information when the reproduction of the main resource is finished, and (ii) permit, after the updating of the license information, the start of reproducing the resource that has been determined as not permitted.

5. The contents reproduction device according to claim 3, wherein:
- the main resource includes a motion picture; and
- the sub resource includes a still picture and does not include a motion picture.

6. The contents reproduction device according to claim 5, wherein:
- the sub resource includes a plurality of still pictures that are associated with the main resource and that have been encrypted;
- the contents reproduction device further comprises:
    - a decryption unit that decrypts the plurality of still pictures collectively to generate a plurality of decrypted still pictures; and
    - a cache unit that stores the plurality of decrypted still pictures; and
- the reproducing unit, when reproducing the sub resource, reads one or more still pictures from the plurality of decrypted still pictures stored in the cache unit and reproduces the read one or more still pictures.

7. The contents reproduction device according to claim 6, wherein the decryption unit is tamper resistant.

8. The contents reproduction device according to claim 6, wherein:
- the plurality of still pictures are collectively compressed, and the plurality of collectively compressed still pictures are encrypted; and
- the decryption unit decrypts the plurality of encrypted still pictures collectively to obtain the plurality of collectively compressed still pictures, and extracts the plurality of decrypted still pictures from the plurality of compressed still pictures.

9. The contents reproduction apparatus according to claim 3, wherein:
- the license information includes use state information indicating a use state of the content data;
- the processor is further programmed to update the use state information based on a reproduction of each of the plurality of resources; and
- the processor is further programmed to update the use state information only when terminating a reproduction of the main resource.

* * * * *

UNITED STATES PATENT AND TRADEMARK OFFICE
CERTIFICATE OF CORRECTION

PATENT NO. : 8,260,712 B2
APPLICATION NO. : 10/560855
DATED : September 4, 2012
INVENTOR(S) : Masaya Yamamoto It is certified that error appears in the above-identified patent and that said Letters Patent is hereby corrected as shown below:

ON THE TITLE PAGE

Item (73), "Panasonic Corporation, Osaka (JP)" should read --Panasonic Corporation, Osaka (JP), Sony Corporation, Tokyo (JP)--

Signed and Sealed this
Third Day of February, 2015

Michelle K. Lee
*Deputy Director of the United States Patent and Trademark Office*